United States Patent [19]

Frame

[11] 4,194,220
[45] Mar. 18, 1980

[54] LEAKAGE CURRENT COMPENSATING CIRCUIT FOR SEMICONDUCTOR IMAGE SENSOR

[75] Inventor: Wayne W. Frame, Longmont, Colo.
[73] Assignee: Ball Corporation, Muncie, Ind.
[21] Appl. No.: 890,842
[22] Filed: Mar. 27, 1978
[51] Int. Cl.² ............................................. H04N 5/34
[52] U.S. Cl. ................................................. 358/221
[58] Field of Search ............................... 358/221, 173; 250/211 J; 307/310; 323/1, 8, 68

[56] References Cited

U.S. PATENT DOCUMENTS 3,814,849  6/1974  Bucher et al. ...................... 358/221
3,839,669  10/1974  Infante et al. ...................... 358/221

Primary Examiner—John C. Martin
Attorney, Agent, or Firm—Gilbert E. Alberding

[57] ABSTRACT

A dark current compensation system for use with a semiconductor imaging device. A p-n junction, thermally connected to the semiconductor imaging device, is forward biased by a temperature variant voltage. The bias voltage is varied in accordance with the temperature of the junction such that the current through the forward biased junction is substantially equal to the reverse saturation current of the junction times a predetermined constant. A dark current compensation signal is derived from the current through the junction.

17 Claims, 7 Drawing Figures

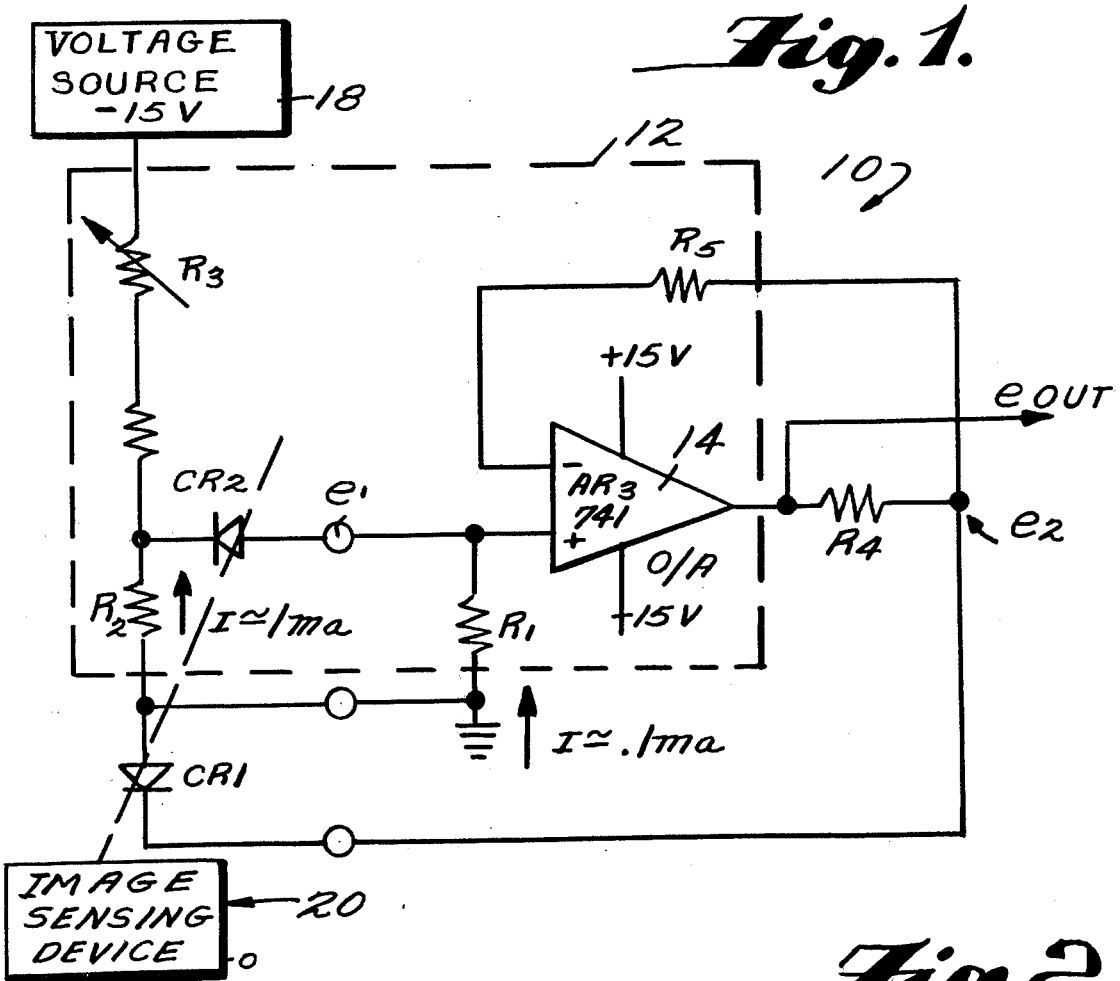
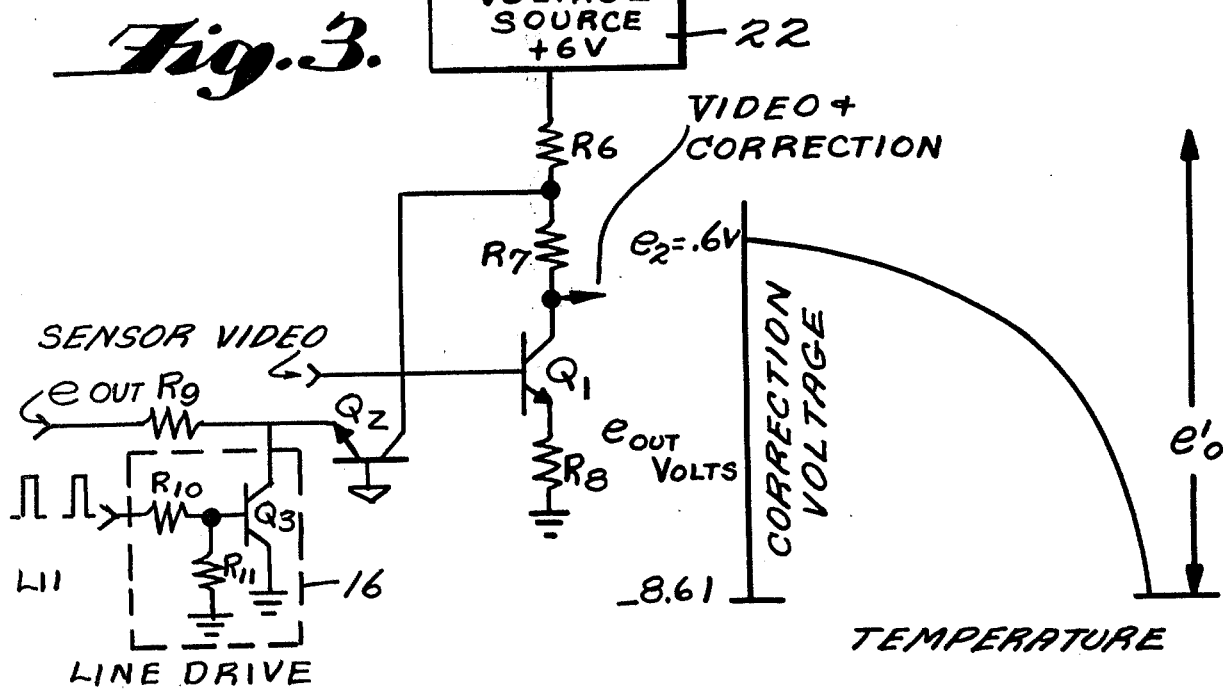

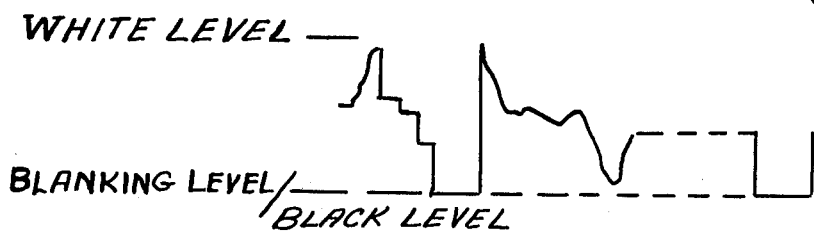
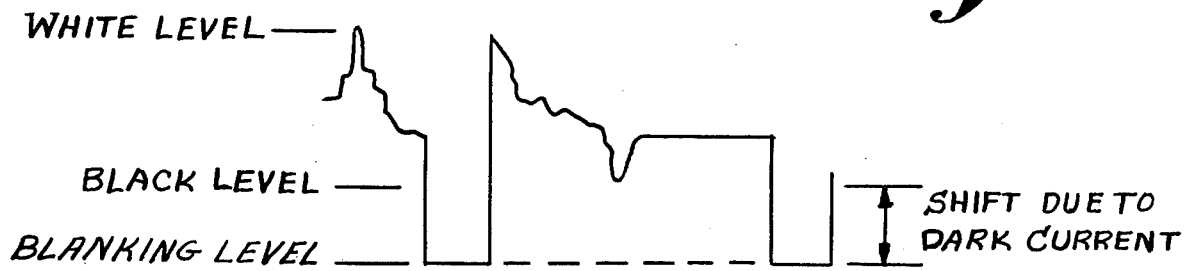

4,194,220

LEAKAGE CURRENT COMPENSATING CIRCUIT FOR SEMICONDUCTOR IMAGE SENSOR

BACKGROUND OF THE INVENTION

The present invention relates to semiconductor image sensing devices and, more particularly, to means for compensating for the leakage current of such semiconductor image sensing devices.

DESCRIPTION OF THE PRIOR ART

Semiconductor image sensing devices (imaging devices) such as silicon diode vidicons are commonly used in television cameras. In such imaging devices a charge-density pattern is formed by photoconduction in response to incident light on a semiconductor target (generally silicon). The charge-density pattern is, in effect, stored on the surface of the semiconductor. The semiconductor surface is raster scanned by an electron beam to produce an output signal. The sensor output signal, however, comprises a video current component proportional to the intensity of light illuminating the imaging device, but also a spurious leakage current component. The leakage current is commonly known as the dark current of the sensor, in that the sensor produces such leakage current even in the absence of light. The leakage current (or dark current) of the imaging device is exponentially dependent on the temperature of the device. For example, a silicon diode vidicon has a leakage current which approximately doubles for each 10° C. increase in the temperature of the device.

U.S. Pat. No. 3,814,849 issued June 4, 1974 to Bucher et al, and commonly assigned with the present application, describes a circuit for compensating for the leakage (dark) current of a semiconductor imaging device. Bucher et al noted that the reverse saturation current of a p-n junction (of the same semiconductor material as the imaging device) manifests a temperature-leakage current characteristic having a constant relationship with the image sensing device dark current-temperature characteristics. To generate a signal indicative of the reverse saturation current of such a junction, a reverse biased diode is maintained at substantially the same temperature as the image sensing device (or with a constant temperature differential). The diode (reverse) leakage current is then amplified to produce a compensation signal equal to the dark current component of the sensor output signal. The sensor output signal and compensation signal are then combined to generate a compensated video signal proportional only to the light absorbed by the sensing device.

The use of a reverse biased diode leakage current to generate the compensation signal, however, necessitates the use of a relatively expensive amplifier. The leakage current of a diode is of relatively small magnitude. Accordingly, the amplifier of the compensation circuit must have a high input impedance. Thus, capacitors must be employed in the circuit to restrict the circuit bandwidth in order to reduce the effects of noise pickup due to the high input impedance. Further, the amplifier must operate with a low input bias current to avoid errors due to bias offsets. Accordingly, the compensation circuit amplifier is a relatively expensive device.

Use of the leakage current entails further problems due to the low level of the current. A component of the diode leakage current exists which is not a function of temperature, but is rather related to surface contamination in the diode. At the typical order of magnitude of the diode leakage current, a significant percentage of the leakage current can be attributable to such contamination.

In addition, a great variance in leakage currents exists between individual diodes of a particular type. Accordingly, the diodes used must be carefully selected for a high leakage current, thereby adding to the manufacturing cost of a camera using such a compensation circuit.

SUMMARY OF THE INVENTION

The present invention provides a leakage current compensation circuit for a semiconductor image sensing device, which does not require careful selection of diodes, and which can utilize low cost amplifiers. A p-n junction, such as a diode, is thermally connected to the image sensing device, or maintained at a constant relative temperature. The diode is forward biased, and the bias voltage across the diode is varied as a predetermined function of the temperature of the sensor device to, in effect, cause the current through the diode to be equal to the normal saturation current ($I_s$) of the diode times a constant gain. The temperature variant biasing voltage is preferably developed by a further forward biased diode in thermal contact with the image sensor (or at the constant relative temperature).

BRIEF DESCRIPTION OF THE DRAWINGS

FIG. 1 is a schematic diagram of a preferred exemplary embodiment of a dark current correction voltage generator;

FIG. 2 is a graph illustrating the temperature dependent correction voltage generated by the circuit of FIG. 1;

FIG. 3 is a schematic diagram of a suitable circuit for combining the sensor output signal and the correction signal to generate a compensated video signal;

FIG. 4A illustrates a typical video waveform at a low temperature;

FIG. 4B illustrates a typical video waveform at an elevated temperature;

FIG. 4C illustrates a typical video waveform at an elevated temperature with a correction signal added; and FIG. 4D illustrates the waveform after DC restoration.

DETAILED DESCRIPTION OF A PREFERRED EXEMPLARY EMBODIMENT

In accordance with one aspect of the present invention, a signal for compensating for the thermal leakage (dark) current of a semiconductor image sensing device is derived from the current through a forward biased p-n junction, such as a diode, maintained in thermal contact with the imaging device (or at a temperature constant with respect to the temperature of the imaging device). A biasing voltage which varies as a predetermined function of the temperature of the junction is applied across the junction such that the current through the junction (hereinafter referred to as the forward current) is substantially equal to the junction reverse saturation current ($I_S$) multiplied by a constant. Saturation current $I_S$ is a function of temperature, typically doubling every 10° C. in a silicon diode, in this regard. It may be considered equivalent to the temperature related component of the junction reverse leakage current. As noted above, the saturation current $I_S$ maintains constant temperature characteristics in relationship with the leakage current temperature characteristic of the image sensing device.

The current of a forward biased p-n junction, such as a diode, is given by the well known diode equation:

$$I = I_S e^{[(V/(AKT/q)) - 1]} \quad (1)$$

where I represents the forward current through the diode; $I_S$, the diode reverse saturation current; V, the forward bias voltage across the diode; K, Boltzman's constant $(1.380 \times 10^{-23}$ joule/°K.); q, an electron charge $(1.602 \times 10^{-19}$ coulomb); T, the absolute temperature; and A, an empirical constant typically ranging from 1 to 3.

If the bias voltage is much greater than, for example, 5 times the quantity AKT/q, Equation 1 becomes equivalent to:

$$I = I_S \exp\left[\frac{V}{AKT/q}\right] \quad (2)$$

rearranging the terms of Equation 2:

$$I_1/I_S = \exp\left[\frac{V}{AKT/q}\right] \quad (3)$$

Equation 3, for a fixed temperature, is similar in form to the equation of a current amplifier operating on the diode saturation current $I_S$. Thus, a dark current compensation signal can be derived from the forward current of a forward biased junction.

However, it should be appreciated, that the "gain" term (exp[V/AKT/q]) of Equation 3 is not only dependent on bias voltage V, but is also temperature dependent. Accordingly, in order to provide a forward current representative of the saturation current $I_S$, a temperature variant biasing voltage must be applied to the diode to, in effect, counteract the temperature dependence of the AKT/q term.

To determine the necessary biasing voltage temperature function, assume that biasing voltage varies linearly with temperature, and that the bias voltage is of value V at temperature $T_1$. At temperature $T_2$, therefore, the bias voltage would be equal to $V + C_1\Delta T$, where $\Delta T = T_2 - T_1$, and $C_1$ is a predetermined constant.

Accordingly, at temperature $T_2$:

$$I_2/I_S = \exp\left[\frac{V + C_1\Delta T}{AK(T_1 + \Delta T)}\right]/q \quad (4)$$

If the gain term is constant, and independent of temperature, as desired, the gain terms at both temperatures $T_1$ and $T_2$ will be equal. That is, $$\exp\left[\frac{V}{AKT/q}\right] = \exp\left[\frac{V + C_1\Delta T}{AK(T_1 + \Delta T)/q}\right] \quad (5)$$

Accordingly, $$\frac{V}{AKT_1/q} = \frac{V + C_1\Delta T}{AK(T_1 + \Delta T)/q} \quad (6)$$

Solving for constant $C_1$, $$C_1 = V/T_1 \quad (7)$$

Thus, if the biasing voltage is set at value $V_1$ at the low end $T_1$ of a desired temperature operating range, and the biasing voltage increases with an increase $\Delta T$ in temperature by $V_1/T_1\Delta T$, the current gain can be stabilized over the range of temperatures, and the forward current of the diode may be expressed:

$$I = I_S H \quad (8)$$

where H is a fixed amount of gain:

$$H = \exp(V_1)/(AKT_1/q) \quad (9)$$

By way of example, the voltage drop across an 1N914 diode is typically 0.6 volts at 27° C. (300° K.). Assuming a silicon imaging device to have an operating temperature range of from 27° C. (300° K.) to 70° C. (343° K.), constant $C_1$ is chosen:

$$C_1 = V/T_1 = 0.6/300 = 0.002 \text{ volts/°K.} \quad (10)$$

Thus, by forward biasing a 1N914 diode with a voltage that changes 0.002 volts/°K., the forward current through the diode becomes representative of the diode reverse saturation current $I_S$.

It should be noted that the correction voltage that must be added to the forward biased diode (0.002 volts/°C.) is equal to the temperature sensitivity of an 1N914 diode when operating in an constant current mode of 0.1 ma. Thus, a particularly straight-forward and simple compensation signal generator in accordance with the present invention can be constructed utilizing two forward biased diodes in thermal contact with the imaging device. The forward bias voltage for one diode, is developed in part, by the voltage drop across the other. Such a circuit (10) is illustrated in FIG. 1. It should be appreciated, however, that the temperature variant biasing voltage can be provided by any suitable means, such as, for example, thermistor circuits or the like.

Referring now to FIG. 1, diodes $CR_1$ and $CR_2$ are mounted in thermal contact with a semiconductor image sensing device 20. Diode $CR_1$ is forward biased by means, generally indicated as 12, including diodes $CR_2$ and an operational amplifier (op amp) 14. Op amp 14 is suitably of the type UA741. More specifically, a resistor $R_1$ is coupled from the non-inverting input terminal of the operational amplifier 14 to ground potential. The anode of diode $CR_2$ is serially connected to the non-inverting input terminal and the cathode of diode $CR_2$ coupled, through a resistor $R_2$ to ground potential. The juncture between diode $CR_2$ and resistor $R_2$ is coupled through a variable resistor $R_3$ to a voltage supply 18 suitably −15 volts. The anode of diode $CR_1$ is connected to ground potential, and the cathode thereof connected through a resistor $R_4$, to the output terminal of op amp 14. Feedback to the inverting input terminal of op amp 14 is supplied from the juncture between resistor $R_4$ and the cathode of diode $CR_1$, suitably through a resistor $R_5$. The values of resistors $R_1$ and $R_5$ are suitably chosen to be substantially equal, to minimize the effect of the input bias current of operational amplifier 14. Resistor $R_4$ is chosen at any convenient value, suitably 13KΩ. The values of resistors $R_1$, $R_2$ and $R_4$ are suitably chosen such that when in cooperation with the voltage source 18, a forward current of approximately 0.1 ma is provided through diode $CR_2$, and approximately 1 ma through resistor $R_2$. It should be appreciated that a positive voltage source 18 can be utilized, but in such an instance, the polarity of diodes $CR_1$ and $CR_2$ would be reversed.

Operational amplifier 14 operates as a voltage follower, the feedback loop from the juncture of resistors $R_4$ and diode $CR_1$ causing the voltage ($e_2$) at the juncture to equal the voltage ($e_1$) applied to the non-inverting input terminal. Voltage $e_1$ is equal to the junction drop across diode $CR_2$ plus the voltage drop across $R_2$. As previously noted, the junction drop changes as a function of temperature in accordance with the desired $C_1$ factor (0.002 volts/°C.). Thus, biasing voltage $e_2$ across diode $CR_1$ (made equal to voltage $e_1$ by op amp 14) changes in accordance with the desired $C_1$ factor. Diode $CR_1$ thus provides a forward current equal to the saturation current $I_S$ times a constant, as explained above.

The output voltage $e_{out}$ taken at the output terminal of op amp 14, is thus equal to the voltage drop $e_o'$ across resistor $R_2$, plus the voltage drop $e_2$ across diode $CR_1$, (effectively one junction drop at the temperature of the imaging device). It should be appreciated that the voltage dropped across resistor $R_2$ ($e_o'$) is a function of the current through diode $CR_1$. As also noted above, the saturation current $I_S$, and thus output voltage $e_{out}$, vary in temperature in the same manner as the leakage current of the semiconductor image sensing device. Such voltage can be, in effect, reconverted into a current and combined with the sensor output signal to generate a compensated video signal.

The correction voltage $e_{out}$ is shown in FIG. 2 as a function of temperature over a typical operating range of a semiconductor imaging device (27° C.-70° C.). The correction voltage closely corresponds in temperature dependence to a silicon image sensing target dark current.

A suitable circuit for generating the compensated video signal is shown in FIG. 3. The image sensor output signal is applied to the base of a transistor $Q_1$, which transistor $Q_1$ is connected in a common emitter amplifier configuration. The collector of transistor $Q_1$ is coupled through serially connected resistors $R_6$ and $R_7$ to a voltage source 22, suitably +6 volts. The emitter of transistor $Q_1$ is connected through a resistor $R_8$ to ground potential.

Typical image sensor output signal waveforms with the sensor at a low temperature and at an elevated temperature, are shown in FIGS. 4A and 4B, respectively. The indicated black level and white level, respectively represent the normal maximum whiteness and blackness signal levels produced by the image sensor during the trace (scan) of the image sensing device. The output signal is normally blanked at the black level. However, as is shown in FIG. 4B, where the dark current is large due to increased temperatures, a significant differential between the black level and blanking level can occur.

The output signal $e_{out}$ of circuit 10 is applied through a resistor $R_9$ to the emitter of a transistor $Q_2$. The base of transistor $Q_2$ is connected to ground and the collector thereof is connected to the juncture between resistors $R_6$ and $R_7$. The correction voltage $e_{out}$, causes an emitter current to flow in transistor $Q_2$. Accordingly, the voltage drop across resistor $R_6$ is proportional to the magnitude of the correction voltage. The base emitter drop of transistor $Q_2$ effectively cancels the offset voltage attributable to the forward drop of diode $CR_1$ in correction voltage $e_{out}$. The signal at the collector of transistor $Q_1$ is illustrated in FIG. 4C.

A chopper, generally indicated as 16, responsive to the image sensor line drive signal is coupled to the emitter of transistor $Q_2$. More specifically, the collector of a transistor $Q_3$ is connected to the emitter of transistor $Q_2$. The emitter transistor $Q_3$ is connected to ground. The line drive signal is applied through a resistor $R_{10}$ to the base of transistor $Q_3$ across a resistor $R_{11}$ coupled from the base to ground. Transistor $Q_3$, selectively shorts the correction signal $e_{out}$ to ground, in accordance with the line drive signal of the sensor. Transistor $Q_3$ thus, in effect, chops correction signal $e_{out}$. Thus, correction signal pulses are added to the sensor output signal during the retrace period of the sensor. The output signal of transistor $Q_1$ (as shown in FIG. 4C) is then clamped by suitable circuitry (not shown) at the level established by the composite signal. The blanking and black levels are, thus, equalized for the subsequent trace, in effect, determining the final black level of the output signal during the trace.

With reference again to FIG. 1, the image sensing system is initially calibrated as follows. A test pattern is imaged on the sensor and desired blanking level is set before the sensor warms up (at 25° ambient temperature). The image sensing temperature is then elevated to near the upper operating temperature range. Resistor $R_3$ is then adjusted until the same blanking level is achieved as when the sensor was cold.

It should be appreciated that the above description is of illustrative embodiments of the present invention, and that the invention is not limited to the specific form shown. For example, p-n junctions, other than diodes may be utilized. Further, as noted above, any suitable means can be utilized for providing an appropriate temperature variant voltage to forward bias diode $CR_1$. Similarly, circuits other than that illustrated in FIG. 3 can be utilized to generate the corrected video signal. Other modifications may also be made in the design and arrangement of the elements without departing from the spirit of the invention as expressed in the appended claims.

What is claimed is:
1. An image sensing system comprising:
 a semiconductor imaging device for generating an output signal having a video current component representative of the intensity of light incident on said imaging device, said imaging device output signal further including a leakage current component proportional to the temperature of said imaging device;
 first means, including first and second forward biased p-n junctions maintained at a respective temperature in constant relationship with the temperature of said imaging device, for impressing the voltage developed across said second p-n junction across said first p-n junction and for generating from the forward current through said first p-n junction an output signal having a magnitude equal to the reverse saturation current of said forward biased p-n junction multiplied by a predetermined constant; and
 second means, responsive to said first means output signal and said imaging device output signal, for generating a compensated video signal representative of the intensity of said light incident on said imaging device.

2. In an image sensing system of the type including sensing means for generating an output signal having a video current component proportional to the intensity of incident light on said sensing means, and a spurious leakage current component proportional to the temperature of said sensing means, means for generating a compensation signal proportional to said leakage current component, and means, responsive to said sensing means output signal and said compensation signal, for generating a video signal indicative of said intensity of said incident light, the improvement wherein said means for generating a compensation signal comprises:

a first p-n junction in fixed thermal relationship with said sensing means; and means, including a second p-n junction in fixed thermal relationship with said sensing means, for forward biasing said junction with a biasing voltage, said voltage varying in accordance with the temperature of said sensing means, the forward current through said first p-n junction being utilized to develop said compensation signal.

3. In an image sensing system of the type including sensing means for generating an output signal having a video current component proportional to the intensity of incident light on said sensing means, and a spurious leakage current component proportional to the temperature of said sensing means, means for generating a compensation signal proportional to said leakage current component, and means, responsive to said sensing means output signal and said compensation signal, for generating a video signal indicative of said intensity of said incident light, the improvement wherein said means for generating a compensation signal comprises:

first and second p-n junctions, both maintained at temperatures in constant relationship with the temperature of said sensing means, said first p-n junction developing a voltage in accordance with the temperature of said sensing means, means for applying said developed voltage to said second p-n junction to forward bias said second p-n junction; and means, responsive to the forward current through said second p-n junction, for developing therefrom said compensation signal.

4. In an image sensing system comprising in combination:

a semiconductor imaging device for generating an output signal having a video current component proportional to the intensity of incident light on said sensing means, said imaging device output signal further including a spurious leakage current component proportional to the temperature of said imaging device;

a first p-n junction in fixed thermal relationship with said imaging device;

means for forward biasing said junction with a biasing voltage;

means, including a second p-n junction in fixed thermal relationship with said imaging device, for varying said biasing voltage in accordance with the temperature of said imaging device;

means, responsive to the forward current through said first p-n junction for generating a compensation signal proportional to said leakage current component; and means, responsive to said sensing means output signal and said compensation signal, for generating a video signal indicative of said intensity.

5. An image sensing system comprising:

a semiconductor imaging device for generating an output signal having a video current component representative of the intensity of ligh incident on said imaging device, said imaging device output signal further including a leakage current component proportional to the temperature of said imaging device, a first p-n junction, maintained at a temperature in constant relationship with the temperature of said imaging device, means, including a second p-n junction maintained at a temperature in constant relationship with the temperature of said imaging device, for generating a biasing voltage to said first p-n junction and applying said biasing voltage to forward bias said first p-n junction, said biasing voltage varying as a predetermined function of the temperature of said imaging device, means, responsive to the forward current through said first p-n junction for developing a compensation current substantially equal in magnitude to said leakage current component; and means, responsive to said imaging device output signal and said compensation signal, for producing a video signal substantially equal to said imaging device output signal video current component.

6. An image sensing system comprising:

a semiconductor imaging device for generating an output signal having a video current component representative of the intensity of light incident on said imaging device, said imaging device output signal further including a leakage current component proportional to the temperature of said imaging device;

first and second p-n junctions, maintained at a temperature in constant relationship with the temperature of said imaging device;

first means, cooperating with said second p-n junction, for generating a voltage of a magnitude in accordance with a predetermined function of the temperature of said p-n junctions and applying said voltage to said first p-n junction to forward bias said first p-n junction such that the forward current through said first p-n junction is substantially equal to the thermal saturation current of said first p-n junction multiplied by a constant; and second means, responsive to the forward current through said first p-n junction and said imaging device output signal, for generating a video signal indicative of the intensity of said light incident on said imaging device.

7. In an image sensing system of the type including sensing means for generating an output signal having a video current component proportional to the intensity of incident light on said sensing means, and a spurious leakage current component proportional to the temperature of said sensing means, means for generating a compensation signal proportional to said leakage current component, and means, responsive to said sensing means output signal and said compensation signal, for generating a video signal indicative of said intensity of said incident light, and improved wherein said means for generating compensation signals comprises:

a first p-n junction, maintained at a temperature in constant relationship with the temperature of said imaging device; and first means, including a second p-n junction, maintained at a temperature in constant relationship with the temperature of said imaging device, for generating a voltage of a magnitude in accordance with a predetermined function of the temperature of said p-n junctions and applying said voltage to said first p-n junction to forward bias said first p-n junction such that the forward current through said first p-n junction is substantially equal to the thermal saturation current of said first p-n junction multiplied by a constant.

8. An image sensing system comprising:

a semiconductor imaging device for generating an output signal having a video current component representative of the intensity of light incident on said imaging device, said imaging device output signal further including a leakage current component proportional to the temperature of said imaging device;

a first p-n junction, maintained at a temperature in constant relationship with the temperature of said imaging device, said first p-n junction when forward biased generating a current I, $$I = I_S \exp[(V/)(AKT/q) - 1]$$

where I represents a forward current through the diode; $I_S$ the diode reverse saturation current; V, the forward bias voltage across the diode; K, Boltsman's constant ($1.380 \times 10^{-23}$ joule/°K.); q, an electron charge ($1.602 \times 10^{-19}$ coulomb); T, the absolute temperature; and A, an empirical constant typically ranging from 1 to 3;

first means, including a second p-n junction, maintained at a temperature in constant relationship with the temperature of said imaging device for forward biasing said first p-n junction with a temperature variant voltage, said voltage being equal to a value $V_1$ at a first temperature $T_1$ and increasing with an increase $\Delta T$ in temperature in accordance with $(V_1 \Delta T)/T_1$; and second means, responsive to the forward current through said first p-n junction and said imaging device output signal, for generating a video signal indicative of the intensity of said light incident on said imaging device.

9. The image sensing system of claims 1, 4, 5, 6, 7 or 8 wherein said first p-n junction is in thermal contact with said imaging device.

10. The image sensing system of claim 2 wherein said p-n junctions are in thermal contact with said sensing means.

11. The image sensing system of claim 3 wherein said first and second p-n junctions are in thermal contact with said sensing means.

12. The image sensing system of claims 1, 4, 5, 6, 7 or 8 wherein said first and second p-n junctions are in thermal contact with said imaging device.

13. The image sensing system of claim 6 wherein said first means comprises:

means for forward biasing said second p-n junction; and operational amplifier means for impressing the voltage developed across said second p-n junction across said first p-n junction.

14. The image sensing system of claims 1, 4, 6, 7 or 8 wherein said first p-n junction is a diode.

15. In an image sensing system of the type including sensing means for generating an output signal having a video current component proportional to the intensity of incident light on said sensing means, and a spurious leakage current component proportional to the temperature of said sensing means, means for generating a compensation signal proportional to said leakage current component, and means, responsive to said sensing means output signal and said compensation signal, for generating a video signal indicative of said intensity of said incident light, and improved wherein said means for generating compensation signals comprising:

first and second p-n junctions, both maintained at temperatures in constant relationship with the temperature of said sensing means, an operational amplifier having inverting and non-inverting input terminals and an output terminal; and first, second, third and fourth, resistances, said first resistance being connected between the non-inverting input terminal and ground potential, said second resistance and said first p-n junction being serially connected between said operational amplifier output terminal and ground potential, the juncture between said first p-n junction and said second resistance being connected to said operational amplifier inverting input terminal; and said second p-n junction and said third resistance being serially connected between said operational amplifier non-inverting input terminal and ground potential, the juncture between said second p-n junction and said third resistance being coupled through said fourth resistance to a voltage source; whereby said first and second p-n junctions are forward biased.

16. The system of claim 15 wherein said fourth resistance includes a variable resistor.

17. The system of claims 15 or 16 wherein the juncture between said first p-n junction and said second resistance is coupled to said operational amplifier inverting input terminal through a fifth resistance approximately equal to said first resistance.

* * * * *